United States Patent [19]

Walter et al.

[11] Patent Number: 5,718,931
[45] Date of Patent: Feb. 17, 1998

[54] FABRICATED FRUIT PIECES AND METHOD OF PREPARATION

[75] Inventors: Dara L. Walter, Plymouth; Dean F. Funk, Brooklyn Park, both of Minn.

[73] Assignee: General Mills, Inc., Minneapolis, Minn.

[21] Appl. No.: 629,181

[22] Filed: Apr. 5, 1996

[51] Int. Cl.$^6$ ............................ A23L 1/0522; A23L 1/05
[52] U.S. Cl. .................. 426/102; 426/573; 426/575; 426/576; 426/578; 426/615; 426/632; 426/634; 426/660
[58] Field of Search ..................... 426/102, 573, 426/575, 576, 578, 615, 632, 634, 660

[56] References Cited

U.S. PATENT DOCUMENTS

| | | | |
|---|---|---|---|
| 2,855,315 | 10/1958 | Perrozzi et al. | 426/102 |
| 4,961,943 | 10/1990 | Blanthorn et al. | 426/102 |
| 5,364,643 | 11/1994 | Morimoto et al. | 426/102 |

FOREIGN PATENT DOCUMENTS 1564452  4/1980  United Kingdom ................. 426/102

*Primary Examiner*—Helen Pratt
*Attorney, Agent, or Firm*—John A. O'Toole; L. MeRoy Lillehaugen

[57] ABSTRACT

A low fat coated dry fabricated fruit pieces are provided that simulate dried fruit pieces for use as a particulate additive in a Ready-To-Eat cereal. The coated fruit piece includes about 25% to 50% of a low moisture gelled center having high humectant levels and about 50% to 75% of a base coating comprising dried fruit material in particulate form and about 1% to 10% of thin film top coat. Methods for preparing such fabricated fruit pieces are provided comrising the steps of (A) forming a low moisture gelled center having high levels of humectant to form sticky gelled core pieces; (B) optionally coating the low moisture gelled center with dried particulate fruit to form a gelled center having a dried fruit particulate base coat; and (C) applying a final thin film coating comprising a sweetened aqueous dispersion of a film forming hydrophilic colloid.

28 Claims, No Drawings

FABRICATED FRUIT PIECES AND METHOD OF PREPARATION

FIELD OF THE INVENTION

The present invention relates to food products and to their methods of preparation. More particularly, the present invention relates to simulated fruits and to their methods of preparation, and to Ready-To-Eat cereals containing such simulated fruit pieces.

BACKGROUND OF THE INVENTION

Ready-To-Eat ("R-T-E") breakfast cereals frequently comprise a mixture of dried cereal pieces or "cereal base" and particulate additives of various types forming blended R-T-E cereal products. Popular classes of additives include 1) dried fruit pieces such as raisins, 2) nuts, e.g., sliced almonds, and 3) sweet confections such as dried marshmallows.

While dried fruits are especially popular, fruits must be dried to sufficiently low water activities or moisture will tend to migrate during storage from the fruit to the R-T-E cereal base. Such moisture migration from the dried fruit to the cereal base can in mild cases lead to loss of crispness in the cereal base or other textural degradation. With more severe migration moisture migration, mold growth can even occur. To avoid the problems of moisture migration, the fruit must be dried to such low moisture levels that the dried fruit pieces become undesirably hard.

To minimize the development of undesirable hardness of the dried fruit pieces, the prior art teaches infusion of fruits, especially raisins with low molecular weight solutes such as sugars and humectants such as glycerol.

One problem resides in infusing sufficient amounts of such humectants to lower the dried fruits' water activity sufficiently to maintain stability when admixed with R-T-E cereals for extended times. Addition of high levels of humectants can lead to perceptible off-flavors associated with the humectants.

Still another problem with infusing humectants resides in that, unfortunately, some popular fruits, especially composite fruits, such as raspberries, blackberries, or strawberries are especially difficult to infuse and dry due to their fragility.

To provide dried fruit products, the art includes efforts to provide simulated fruits. Typically, a simulated fruit is fabricated by adding a gelling agent to a fruit juice, fruit puree, or flavored solution and causing variously sized and shaped droplets to be gelled such as by dropping into an aqueous solution of a water soluble calcium salt. The calcium ions cause the gelling agent to set up to form a gel. In some instances, the gelled piece is then dried to form a dried simulated piece.

In view of the popularity of such fruit, nuts, and confection ingredients, several fabricated ingredients comprise two or more of these popular ingredient types. For example, one popular additive is sweetened cereal coated raisins colloquially referred to as raisinuts such as in Raisin Nut Bran™ R-T-E cereal. Another composite additive is fabricated from nut pieces, expanded cereal dough pieces, and sweetener such as in Clusters™ R-T-E cereal.

Such sweetened cereal coated raisins are popular since the composite piece includes the fruit, nut and confection components in a single piece. The coated pieces have a soft and chewy texture that provides a pleasing texture contrast to the crunchy texture of the R-T-E cereal base.

Such coated raisins have been manufactured by the well known panning techniques used in the confectionery art for preparing panned or coated confections. Panned confections such as sugar coated peanuts and gum balls, are prepared by adding the base to an inclined rotating pan and tumbled while sugar, syrup and fat are intermittently added to build up a dry coating onto the particulate base until a coating of desired thickness is built up. Various cereal ingredients can also be added to the coating composition to adjust the flavor, composition, and texture of the coating. A good description of this common panning technique is given in U.S. Pat. No. 4,961,943 entitled "Process For Preparing Cereal-Coated Dry Fruit" issued Oct. 9, 1990 to Blan Thorn et al.

While popular, current cereal coated raisin are relatively high in fat content due to high levels of oil used in the coating in addition to the fat contributed by the nut meat ingredient of the coating composition. The high fat content of the cereal coated raisin provides desirable lubricity and is important to maintaining the softness of the raisin by inhibiting moisture migration from the raisin to the relatively drier R-T-E cereal base with which it is admixed. As the raisin loses moisture, the raisin becomes undesirably tough.

Another example of a blended R-T-E cereal includes an R-T-E cereal base, e.g., whole wheat and/or bran flakes and raisins or other dried fruits. In order to prevent the hardening of the dried fruit in the R-T-E cereals, sometimes the R-T-E cereals are made with a higher moisture content. Unfortunately, at higher cereal piece moisture contents, the R-T-E cereal base pieces are not as crisp and frangible as desirable. Also, this higher moisture content or hydration of the R-T-E cereal base adversely affects the products shelf stability. Rather than hydrating the R-T-E cereal base, another approach is to coat the raisins with a wax or fat coating to inhibit moisture migration from the raisin to the R-T-E cereal base. One problem with this approach is an undesirable mouth feel imparted by the waxy or fatty raisin coating. Another problem is the increase in the fat content of the R-T-E cereal product due to the added fat from the fat coated raisins.

Moreover, in view of the increasing health concerns regarding reducing the amount of fat intake in the diet, it would thus be desirable to produce a simulated composite fruit piece, or other fruit piece, having a soft gelled interior yet having a water activity that provides stability when blended with an R-T-E cereal base.

It would be further desirable to provide a simulated fruit piece that did not have objectionable flavors associated with high levels of humectants.

It would be further desirable to provide simulated fruit pieces that did not have high levels of fat.

It would be further desirable to provide a simulated fruit piece suitable for blending with an R-T-E cereal base that does not cause deterioration of the textural qualities of either the cereal base or dried fruit piece over time.

It would be further desirable to produce a composite simulated fruit piece whose appearance resembled a dried form of the natural fruit, rather than a cube or a nugget.

The present invention is directed to a low fat simulated fruit piece having high humectant levels which nonetheless have acceptable flavor as well as texture and are particularly suitable for use as and ingredient in blended R-T-E cereal products. The simulated dried fruit pieces are shelf stable for extended periods and retain their soft but chewy texture. Moisture is substantially inhibited from migrating out of the simulated fruit piece into the flake such that the pieces retain their moistness and the cereal base remains crisp.

SUMMARY OF THE INVENTION

In its product aspect, the present invention resides in simulated dried fruit pieces having:

A. a low moisture gelled center having high levels of humectant;

B. an optional fruit particulate "base coat" or shell comprising a dried particulate fruit material, especially dried infused fruit particles; and C. a thin topical film top coat.

The dried simulated fruit pieces are particularly suitable for blending with an R-T-E cereal base to form a finished blended R-T-E cereal product, for adding to cake, muffin or pancake dry mixes or for consuming alone as a snack food.

The simulated dried fruit pieces have a water activity ranging from about 0.3 to 0.5. The fruit pieces range in size from about 0.5 to 1.1 g. The center comprises about 25% to 99% of the soft gelled center while the dried particulate fruit or "base coat" comprises about 0% to 75%. The topical or top coat film coating comprises about 1% to 10%.of the finished product.

The base coat includes a dried fruit in particulate form ranging in size from about 0.5 to 3 mm.

The top coat comprises an aqueous sweetened dispersion of a film forming hydrophilic colloid. A topical coating of oil, or inclusion of oil as a suspended emulsion in the hydrocolloid film, to facilitate handling is optional.

In its method aspect, this invention is directed to methods for producing a product having a soft simulated fruit piece center and an optional dried fruit material in particulate form in the form of a base coat or shell, and a topical thin film coating. The present methods essentially comprise the steps of:

(A) forming a low moisture gelled center having high levels of humectant to form sticky gelled core pieces;

(B) optionally coating the low moisture gelled center with dried particulate fruit to form a gelled center having a dried fruit particulate base coat; and (C) applying a final thin film coating comprising a sweetened aqueous dispersion of a film forming hydrophilic colloid.

The core pieces each weigh about 0.5–1.1 g. The center gel formation step is practiced without a drying step.

DETAILED DESCRIPTION OF THE INVENTION

In its product aspect, the present invention provides simulated fruit pieces comprising a soft gel core and base coat of a particulate fruit. The composite products further include a thin film top coat. Product components and ingredients thereof as well as composition preparation and use are described in detail below.

Throughout the specification and claims, percentages are by weight and temperatures in degrees Fahrenheit, unless otherwise indicated.

A. Low Moisture/Low Aw Gelled Center

The present simulated fruit pieces essentially comprise a low moisture gelled center as its core. The core portion essentially comprise a flavored, salty, sweetened, acidified gel formed from a modified starch that hydrates at low temperature and moisture levels and that contains high levels of humectants.

Specifically, the gel essentially comprises:

| Ingredient | Weight % of Gel | Weight (Preferred) % of Gel |
|---|---|---|
| Humectant(s) | 45% to 60% | 50% to 54% |
| Corn syrup | 15% to 25% | 18% to 22% |
| Acidulant(s) | 0.8% to 1.5% | 1.5% to 1.9% |
| Modified starch(s) | 9% to 15% | 10% to 11% |
| Salt | 0.1% to 1% | 0.4% to 0.6% |
| Colorant, flavor(s) | 1% to 5% | 2% to 4% |
| Moisture | 5% to 10% | 7% to 9% |

The humectant can be any commonly employed humectant ingredient. Preferred humectants are selected from the group consisting of sorbitol, xylitol, manitol, glycerin, glycerol, propylene glycol and mixtures thereof. Preferred for use herein is a mixture of sorbitol and glycerin.

The gel also essentially comprises a dissolved low molecular weight sugar (200MW>) or sugar(s) syrup. The molecular weight sugar can include fructose, dextrose, sucrose, honey (especially deflavored honey), maltose, glucose, invert sugar and mixtures thereof. Especially suitable for use as the sugar syrup is high fructose corn syrup. Of course, other grain syrups, e.g., maltose syrups, rice syrups, or other corn syrups can be used to supply all or a portion of the dissolved sugar ingredient. In other variations, the sugar syrup can include solids derived from fruit juices in full or partial substitution for the dissolved sugar(s) ingredient.

The acidulant can include any commonly employed edible organic material to provide the gel center with a pleasantly tart taste reminiscent of a fruit. The acidulant provides pH adjustment, stability, and flavor enhancement benefits. Useful herein as the acidulant is adipic, citric acid, fumaric, malic acid, and mixtures thereof. Preferred for use herein as an acidulant is a blend of malic and citric acids. Such acids desirably give the finished product tartness in flavor as well as enhancing certain flavors, especially berry, citrus and grape flavors. In addition, acidulants assist in minimizing off-flavors associated with humectant materials. The acidulants can comprise about 0.1% to 2.0% of the gel center, preferably about 1.5% to 1.9%. The acidulant is generally employed within the above concentration ranges to provide a pH ranging from about 2.7 to 4.3.

Surprisingly, inclusion of salt at the present levels and in combination with the starches and acidulant(s) is important to masking the flavor of the humectants. Such humectant taste masking is important to being able to provide products having the high levels of humectant herein while maintaining sensory acceptability.

The moisture content includes not only added water but also the residual moisture contributed by any of the ingredients such as the syrup(s), water based flavors and/or colors.

The moisture content of the dried fruit piece center is at sufficiently low level to be shelf stable. Since the bioavailability of moisture is also dependent upon how the moisture is bound to the fruit materials, the water activity ("Aw") of the dried fruit piece core should range from about 0.3 to 0.5 to ensure the shelf stability of the finished coated fruit piece. For better results in terms of balancing texture and ensuring stability, the Aw of the fruit pieces should range from about 0.35 to 0.45. Generally, the moisture content will range from about 7% to 12% of the gel center formulation.

Particularly defined modified starches are essential ingredients in formulating the gel center. The modified starches are the gel forming ingredient. Importantly, the modified starches are selected to be not only capable of remaining stable under the acidic conditions but also to be gel-forming by hydration at low moisture contents and at low temperatures. Useful herein as the modified gel forming starch ingredients are particular modified corn starches, modified tapioca starches and especially mixtures thereof. By selection and blending of starches a finished product having the right bite and other textural attributes can be realized. Especially suitable for use herein as the modified corn starch is a material commercially available from Staley Corporation identified as MiraGel 463. For the modified tapioca starch, especially useful is a starch commercially available from National Starch and Chemical identified as Stir-n-Set.

The gel core can comprise about 25% to about 99% of the coated fruit piece. In those preferred embodiments additionally including a dried fruit particulate base coat, the gel core preferably comprises about 25% to 50% more preferably about 35% to 45%, depending in part upon the amount of texture desired as the core, other organoleptic attributes desired, cost, and flavor. For best results, the gel simulated fruit core can comprise about 40% to 45% of the simulated dried fruit pieces.

The fruit piece core can conveniently range from about 0.5 to 1.1 g in size while preferred sizes range from about 0.3 to 0.5 g.

B. Dried Particulate Fruit Coating

In the most preferred embodiment the present dried simulated fruit pieces further comprise a first or base coat of a dried particulate fruit coating applied to the low moisture gelled center. If present, the base coating can comprise about 1% to 75%, preferably about 55% to 65% of the dried simulated fruit pieces.

The dried particulate fruit can be any dried fruit fabricated fruit piece in particulate form generally used in preparing snack foods and breakfast cereals. Examples of such fruits include apples, apricots, bananas, blueberries, cantaloupe, cherries, cranberries, currants, dates, figs, lime, orange, papaya, pears, pineapple, prunes, raisins, strawberry, tangerine, watermelon, and mixtures thereof. Preferred for use herein as the fruit particulate pieces are apples, cherries, blueberries, cranberries and mixtures thereof. In one variation the simulated dried fruit pieces are used to simulate dried composite fruits, e.g. raspberries. The most highly preferred dried fruits are derived from such composite fruits including blackberry, raspberry, strawberry and mixtures thereof.

The fruit piece base coat can also be a fabricated fruit particulates prepared from a gelled fruit puree. Such fabricated puree pieces provide great flexibility of sources and blends of fruit materials. In less preferred embodiments, the fruit particulates can comprise simulated fruit particulates prepared from fruit flavored dried gum gels. However, such artificial fruit particulates do provide a low cost alternative or extender to more expensive dried fruit materials.

Preferred for use herein are dried fruit materials that are infused with a humectant in particulate form such that 100% pass through a US standard size No. 8 screen while 100% remain on a US standard size No. 6 screen. Thus, generally, such particulates range from about 0.5 to 4 mm in size, preferably about 1 to 3 mm.

In an embodiment particularly suitable for use as an additive to another food product such as an R-T-E cereal, the finished product comprises about 20% to 60% of the dry fruit particulate coating portion, preferably about 30% to 50% and about 50% to 75%, preferably about 20% to 35%, of the soft gelled center.

If desired, the particulate base coating portion itself may comprise about 1% to 25%, preferably about 10% to 15%, of one or more cereal components derived from a dried cooked cereal dough in similarly sized particulate form to provide a crisp or crunchy texture to simulated fruit piece. The cereal component can be any ground, crushed, or comminuted cereal material that is capable of producing a crunchy texture in the finished simulated fruit piece. The crunchy cereal material can be supplied by or from any conventional cereal form such as flakes, shreds, biscuits, puffed cereal pieces, e.g., puffed rice. The preferred crunchy components include for example, wheat germ, shredded wheat fines, whole wheat flake cereal fines, puffed rice pieces, corn, wheat, and/or rice brans and mixtures thereof. The dry particulate coating can also include a nut flavoring, nut meal or nut particles. The nut materials are preferably selected from the group consisting of almond, walnut, pecan, macadamia, peanut and hazel nut. The nut meal or nut particles have a particle size between about 12 mesh and 16 mesh. These materials impart a good crunchy texture to the coating. Colored puffed rice is preferred where a crisp texture is desired in a simulated berry piece.

The cereal derived particulate base coat component has a particle size distribution sufficiently large to form a coating with fruit particulates over the soft gel center yet which is nonetheless sufficiently small to ensure the particles will adhere to the center. Good results are obtained when the particle size of the cereal material is approximately the same size as that of the dry fruit material portion with which it is admixed.

An optional coloring agent can also be added to the dry fruit material or cereal particulates to enhance the consumer appeal. The coloring agent can be in either liquid or particulate form. When a coloring agent is desired, the color is generally selected to complement the flavor and appearance of the finished product.

The desired flavor, coating thickness and textural character of the coating will further influence the composition.

C. Top Coating

The present simulated fruit products desirably additionally include an exterior thin film top or finish coating or shell. The thin film top coating or shell produces a slight binder effect to prevent shedding or loss of the dried fruit particulate base coating. The top coat also serves to reduce the tendency of the dried simulated fruit pieces to stick to one another or to the cereal base. Additionally, the film coating gives the visual impression of a fruit skin.

If desired, the thin film coating formulation can additionally include a variety of optional components to improve the flavor, nutritional, or appearance aspects of the product. For example, the syrup can include salt, flavor, colorants, vitamins, minerals and mixtures thereof. If present, such minor adjutants can each comprise about 0.001 to 5% of the top coat formulation.

In the preferred embodiment, the thin film coating comprises a dilute, sweetened, acidified solution or dispersion of a film forming hydrophilic colloid. The top coat will have a pH ranging from about 3.5 to 4.5 and can include the edible organic acidulants in the center formulation.

The thin film coating can include about 1% to 20%, preferably about 5% to 15% of the formulation of nutritive carbohydrate sweetening ingredients. Sucrose is the preferred sweetener.

The thin film coating solution further essentially comprises about 0.2% to 1% of a film forming hydrophilic colloid. Suitable ingredients are selected from gums such as gellan, locust bean, guar, xanthan and mixtures thereof as well as starches such as modified and/or pregelatinized starches or film forming protein gels. After application of the top coat, the pieces are finish dried to remove the moisture contributed by the top coat solution to provide finish dried simulated fruit pieces having water activity values ranging from 0.3 to 0.5.

In a less preferred variation, the thin film coating can be replaced by simple confectioners glaze or fat based confectioner's coating. One type of confectioners glaze is sold under the trademark OPAGLOS by Colorcon, Inc., while confectioner's coatings are well known in the art. This confectioners glaze is a modified shellac that is able to provide a smooth and glossy surface and, when used in sufficient amounts, can serve as a moisture barrier.

The present simulated dried fruit pieces comprise a sufficient amount of the top coat to minimize shedding of the dried particulate fruit base coat and stickiness. Good results are obtained when the thin film coating comprises about 1% to 10%, preferably about 2% to 4%, of the simulated dried fruit pieces.

Method of Preparation

In its method aspect, the present invention resides in methods of making the present simulated fruit pieces. The present methods comprise the first step of forming a low moisture sweetened gel without a drying step. Only sufficient amounts of moisture are added to contribute the moisture needed for the final moisture content.

In formation of the gel center, a first preblend of the wet ingredients is made. Separately, a preblend of the dry ingredients is likewise made. The preblended dry ingredients are then admixed with the liquid preblend. The mixture is then heated with agitation to about 135° F. (57.2° C.) to about 155° F. (68.3° C.). The mixture is heated for sufficient amount of time to gelatinize and hydrate the starch. As the starch gelatinizes and hydrates, the mixture turns from a milky white to a translucent thickened solution. Importantly, the total moisture content is less than 10% during the gel formation step.

The gelled material is allowed to cool and is cut into appropriately sized pieces (e.g., 3 mm×6 mm×6 mm).

The gel center pieces so formed are sticky. In one embodiment of the invention, the next step involves applying sized particulate pieces to the outer surface of the gel center without additional adhesives such as gums, starches, sugars, proteins or other binders to form composite pieces having a gelled center and a dried fruit particulate base coat. By virtue of the sticky properties of the gel centers, the dried particulate fruit pieces readily adhere.

The pieces of the soft gelled center can be conveniently tumbled in an excess quantity of particulates to coat the surface thereof. The composite pieces can be subjected to mild compression to improve adhesion of the dried particulates with excess loose particulates removed by screening.

In another embodiment, the soft gelled center can be formed into desirably shaped pieces, e.g., spheres, without adding a layer of particulates to the surface.

Thereafter, the present methods essentially comprise applying a particularly defined topcoat to the simulated dry fruit pieces. A top coating solution can be conveniently prepared by admixing a preblend of the top coating dry ingredients with a preblend of the top coating wet ingredients. The wet ingredients and dry ingredients are then admixed and brought to a boil. The top coat formulation is then cooled to a temperature of about 120° F. to 130° F. (47° C. to 55° C.). To the cooled top coat formulation is then added the humectants and flavoring. Optionally, the triglyceride component can be added to the top coat formulation.

The pieces comprising the soft gelled center together with the dried fruit particulates base coat can then be immersed briefly into the top coat formulation to form coated composite pieces. In another variation, the shaped pieces of the soft gelled center can be deposited directly into a bath of the top coating solution. The coated composite pieces are then dried to remove the residual moisture supplied by the top coat formulation. (For example, using forced hot air convection drying with air temperatures at about 130° F., 55° C.). Since only a small amount of moisture is contributed by the top coating formulation, only a modest drying step is required. In practicing the drying step, high exposure to high temperatures, (e.g., above 175° F.) is to be avoided, or at least minimized to prevent undesirable flavors.

The finished top coat so prepared imparts a skin feature that is desirable in providing certain simulated fruit pieces.

Thereafter, the dried simulated fruit products can be coated with a light layer of an edible oil to minimize stickiness.

An advantage of the present invention is that the process does not require the addition of excess water in the soft gelled center formula that must subsequently be removed. Another advantage lies in that the processing temperatures are mild and thus minimize the development of "cooked" or "jammy" flavors.

The present methods can optionally include a step of screening dried simulated fruit pieces to remove any of the particulates from the dried coating composition that have not adhered to the fruit pieces. The screening step can be practiced before or after the application of the top coat, or both.

The simulated dried fruit pieces of the present invention so prepared provide a realistic appearance, texture and visual appeal not achieved by the prior art. The present products are formulated having a water activity in the range of moisture such that the products are stable when blended with an R-T-E cereal base. The present products provide a multi-textured composition that delivers eating characteristics that closely resemble those of similarly sized dried fruit.

The simulated fruit pieces prepared by the present invention can be used in various ways. For example, the pieces can be consumed by themselves as a snack item or in combination with other items, e.g., granola, nuts, etc. The pieces can be added to both dry or instant dry cereals, e.g., oatmeal, which are dry packaged. The simulated fruit pieces can be added to dry cake, muffin or pancake mixes. The simulated fruit pieces can be also be packaged as a snack food.

The present simulated fruit pieces find particular suitability for use as a value added particulate ingredient for ready-to-eat breakfast cereal. The present simulated fruit pieces are blended with the R-T-E cereal base pieces, optionally with other R-T-E cereal additives, e.g., sliced nut meats, in conventional manner to form a blended R-T-E cereal and packaged to form the finished R-T-E cereal product. The R-T-E cereal base can be in any conventional shape or form such as in the form of flakes, shreds, biscuits, shredded biscuits, and puffed pieces of various shapes, and mixtures thereof such as wheat flakes, corn flakes, shredded wheat, puffed wheat, rice, oat, or corn, bran flakes, whole bran cereal, breakfast cereals in the form of extruded and puffed doughs, and the like. Such cereal particles are prepared in conventional manner and may be either toasted or untoasted. The dried simulated fruit pieces can comprise about 1% to 50% of the blended R-T-E cereal while the R-T-E cereal base comprises about 50% to 99%. In more preferred embodiments, the dried simulated fruit pieces comprise about 5% to 30% of the composite R-T-E cereal product while the cereal base comprises the balance.

The cereal base can be fabricated from one or more whole grains or flours, including, for example from wheat, corn, oats, barley, rye, rice, sorghum, amaranth and mixtures thereof. The cereal grains and/or flours are combined with water and cooked and formed into a cooked cereal dough. The cooked dough is then extruded under pressure into cereal pellets. The cereal dough can be rolled, flaked, or expanded as well known in the art. The cereal can be vitamin and mineral enriched.

The simulated fruit pieces are shelf stable for extended periods whether packaged alone or combined with an R-T-E cereal base.

The present simulated fruit pieces have a remarkable extended storage stability while maintaining their desirable texture, color and appearance as compared to conventional dried fruit products.

By modest manipulation of the composition of the present pieces, embodiments can be realized which are relatively more chewy, i.e., by using plasticizers, especially vegetable oils, and by using corn syrup sweeteners or glycerine at higher levels or by adjusting the amount or type of starch. Conversely, if desired, pieces can be realized which are friable but which are still not tough by including grain based particulates in the base coating material.

Still another benefit of the present invention is the realization of flake or shredded cereal products containing simulated fruit pieces wherein the cereal pieces are especially crisp and/or resistant to staling. Since the present fruit pieces can be prepared with Aw's of as low as about 0.3, the cereal pieces can be dried to such lower Aw's to realize the crispness and anti-staling benefits provided herein without adversely affecting fruit piece textures.

EXAMPLE 1

A low water activity simulated raspberry piece of the present invention was made by forming a soft gelled center into rectangular cubes, coating the surface of the cubes with chopped and sized dried glycerated cranberry pieces and coating the composite with a thin film of gellan gum to form a continuous skin over the piece. The proportions are as follows:

|  | Amount | % of Piece |
| --- | --- | --- |
| Soft Berry Center |  | 35.0% |
| Corn Syrup (Iosweet 55% High Fructose Corn Syrup) | 20.3% |  |
| Natural Raspberry Flavor | 1.1% |  |
| Glycerol | 36.0% |  |
| Sorbitol | 16.8% |  |
| Water | 7.2% |  |
| Mod. Corn Starch (Staley Corp., MiraGel 463) | 5.4% |  |
| Mod. Tapioca Starch (National Starch, Stir-N-Set) | 5.5% |  |
| Fructose | 4.0% |  |
| Malic Acid | 0.7% |  |
| Citric Acid | 1.0% |  |
| Blended Carmine Color | 1.0% |  |

-continued

|  | Amount | % of Piece |
| --- | --- | --- |
| Dried seedless raspberry powder | 0.5% |  |
| Salt | 0.5% |  |
|  | 100.0% |  |
| Particulated Fruit Coating |  | 60.0% |
| Glycerine Infused Dried Cranberries | 98.0% |  |
| Natural Raspberry Flavor | 1.0% |  |
| Maltodextrin | 1.0% |  |
|  | 100.0% |  |
| Thin Film Coating |  | 5.0% |
| Sodium Citrate | 0.23% |  |
| Water | 77.48% |  |
| Gellan Gum (Kelcogel F, Kelco, Inc.) | 0.59% |  |
| Citric Acid | 0.20% |  |
| Sucrose | 10.5% |  |
| Blended Carmine Color | 0.5% |  |
| Natural Raspberry Flavor | 0.5% |  |
| Glycerol | 10.0% |  |
| Sunflower Oil | 0.5% |  |
|  | 100.5% |  |

In the preparation of the gel center, the sorbitol and glycerol were added to water to form a humectant syrup. The flavor and corn syrup were then added to the humectant syrup and mixed to uniformity. The remaining dry ingredients were mixed to form a uniform preblend which was subsequently added to the flavored humectant syrup with continuous mixing. The mixture was heated to 140° F. (60DC) with mixing to hydrate the starch to form a gel and poured out to cool to room temperature on a prepared tray. The tray was prepared with a bed monolayer of chopped and sized dried infused cranberry particulates.

The sized cranberry particulates were prepared by first freezing the dried infused cranberries and then cutting them while frozen with an Urschel™ cutter. The cut pieces were then sized by sifting through a U.S. Standard #8 screen and removing fines which passed through a U.S. Standard #6 screen. The particulate material retained on the #6 screen was then used to coat the soft gelled center material.

Upon cooling, the gelled matrix was cut into rectangular cubes and deposited into a bed of excess particulate material. The pieces were tumbled to coat the surface. Excess particulate material was removed. The pieces were then dipped in a bath containing the film forming hydrocolloid gum prepared as described below. The pieces were then placed on a screen and dried in a forced air oven 1½ hours at 130° F. to a final Aw of 0.35.

The film forming hydrocolloid bath was made by first dissolving the sodium citrate in water, then adding the gellan gum with mixing. This mixture was heated to boiling. To the boiling mixture, a preblend of sugar, acid and color were added and mixed until dissolved. The mix temperature was then reduced to 130° F. (54.4° C.) and glycerol and flavorant added. The mix was then cooled to 120° F. (49° C.) and help for dipping the fabricated fruit pieces. After the dipping and drying, the pieces were coated with a fine mist of sunflower oil to facilitate handling.

The simulated raspberry pieces were then mixed with bran flakes at a ratio of 30% w/w and packaged into standard packaging film material to form an R-T-E cereal. The cereal maintained crispness and the simulated fruit remained soft and flavorful for nine months of storage at 70° F. (21° C.) and 40% RH.

EXAMPLE 2

A low water activity simulated raspberry piece of the present invention was made by forming a soft gelled center into rectangular cubes, coating the surface of the cubes with chopped and sized gelled fruit puree and coating the composite with a thin film of gellan gum to form a continuous skin over the piece. The proportions are as follows:

|  | Amount | % of Piece |
|---|---|---|
| Soft Berry Center |  | 35.0% |
|  |  |  |
| Corn Syrup (Iosweet 55% High Fructose Corn Syrup) | 20.3% |  |
| Natural Raspberry Flavor | 1.1% |  |
| Glycerol | 36.0% |  |
| Sorbitol | 16.8% |  |
| Water | 7.2% |  |
| Mod. Corn Starch (Staley Corp., MiraGel 463) | 5.4% |  |
| Mod. Tapioca Starch (National Starch, Stir-N-Set) | 5.5% |  |
| Fructose | 4.0% |  |
| Malic Acid | 0.7% |  |
| Citric Acid | 1.0% |  |
| Blended Carmine Color | 1.0% |  |
| Dried seedless raspberry powder | 0.5% |  |
| Salt | 0.5% |  |
|  | 100.0% |  |
| Particulated Fruit Coating |  | 60.0% |
|  |  |  |
| Sodium Citrate | 0.15% |  |
| Water | 48.4% |  |
| Gellan Gum | 1.0% |  |
| Fructose | 15.0% |  |
| Citric Acid | 0.5% |  |
| Malic Acid | 0.5% |  |
| Seedless Raspberry Puree | 20.0% |  |
| Glycerol | 14.0% |  |
|  | 99.5% |  |
| Thin Film Coating |  | 5.0% |
|  |  |  |
| Sodium Citrate | 0.23% |  |
| Water | 77.48% |  |
| Gellan Gum (Kelcogel F, Kelco, Inc.) | 0.59% |  |
| Citric Acid | 0.20% |  |
| Sucrose | 10.5% |  |
| Blended Carmine Color | 0.5% |  |
| Natural Raspberry Flavor | 0.5% |  |
| Glycerol | 10.0% |  |
| Sunflower Oil | 0.5% |  |
|  | 100.5% |  |

To form the soft gelled center, the sorbitol and glycerol were added to water to form a humectant syrup. The flavor and corn syrup were then added to the humectant syrup and mixed to uniformity. The remaining dry ingredients were mixed to form a uniform preblend which was subsequently added to the flavored humectant syrup with continuous mixing. The mixture was heated to 140° F. (60° C.) with mixing and poured out to cool on a prepared tray. The tray was prepared with a monolayer of chopped and sized gelled raspberry puree particulates.

The gelled raspberry puree particulates were prepared by first dissolving the sodium citrate in water, then adding the gellan gum and heating to boiling. Heat was removed from the liquid and a preblend of the remaining ingredients (fructose, acids, fruit puree and glycerol) was then quickly mixed into the hot solution. The mixture was then poured out into a pan to a depth of about ¼" (6 mm) deep to cool and solidify. After cooling, the gel was cut into ⅛" (3 mm) wide strips and dried on a perforated screen in a forced air oven at 130° F. (54.4° C.) for 1½ hours to an Aw of 0.45–0.50. After drying, the gelled fruit puree could be held under refrigeration until processed into chopped and sized particulates. Chopping and sizing was accomplished as described previously in Example 1 for dried fruit. This material was then used to cover the cooling tray and coat the soft gelled center material.

Upon cooling, the soft gelled center material was cut into rectangular cubes and deposited into a bed of excess particulate material. The pieces were tumbled to coat the surface. Excess particulate material was removed. The pieces were then dipped in a bath containing the film forming hydrocolloid gum. The pieces were then placed on a screen and dried in a forced air oven 1½ hours at 130° F. (54.4° C.) to a final Aw of 0.35.

The film forming hydrocolloid bath was made by first dissolving the sodium citrate in water, then adding the gellan gum with mixing. This mixture was heated to boiling. To the boiling mixture, a preblend of sugar, acid and color were added and mixed until dissolved. The mix temperature was then reduced to 130° F. (54.4° C.) and glycerol and flavorant added. The mix was then cooled to 120° F. (49° C.) and help for dipping the fabricated fruit pieces. After the dipping and drying, the pieces were coated with a fine mist of sunflower oil to facilitate handling.

EXAMPLE 3

A low water activity simulated blueberry piece was made by forming a soft gelled center into spheres and coating the surface with a thin film of gellan gum to form a continuous skin over the piece. The proportions are as follows:

|  | Amount | % of Piece |
|---|---|---|
| Soft Berry Center |  | 90.0% |
|  |  |  |
| Corn Syrup (Iosweet 55% High Fructose Corn Syrup) | 20.3% |  |
| Natural Blueberry Flavor | 1.1% |  |
| Glycerol | 36.0% |  |
| Sorbitol | 16.8% |  |
| Water | 7.2% |  |
| Mod. Corn Starch (Staley Corp., MiraGel 463) | 5.4% |  |
| Mod. Tapioca Starch (National Starch, Stir-N-Set) | 5.5% |  |
| Fructose | 4.0% |  |
| Malic Acid | 0.7% |  |
| Citric Acid | 1.0% |  |
| Grape Skin Extract Color | 1.0% |  |
| Dried blueberry powder | 0.5% |  |
| Salt | 0.5% |  |
|  | 100.0% |  |
| Thin Film Coating |  | 10.0% |
|  |  |  |
| Sodium Citrate | 0.23% |  |
| Water | 76.98% |  |
| Gellan Gum (Kelcogel F, Kelco, Inc.) | 0.59% |  |
| Citric Acid | 0.20% |  |
| Sucrose | 10.0% |  |
| Grape Skin Extract Color | 0.5% |  |
| Natural Blueberry Flavor | 0.5% |  |
| Glycerol | 10.0% |  |
| Sunflower Oil | 0.5% |  |
|  | 100.0% |  |

To form the soft gelled center, the sorbitol and glycerol were added to water to form a humectant syrup. The flavor and corn syrup were then added to the humectant syrup and mixed to uniformity. The remaining dry ingredients were mixed to form a uniform preblend which was subsequently added to the flavored humectant syrup with continuous mixing. The mixture was heated to 140° F. (60° C.) with mixing and deposited by droplets into a bath of film forming hydrocolloid gum.

The film forming hydrocolloid bath was made by first dissolving the sodium citrate in water, then adding the gellan gum with mixing. This mixture was heated to boiling. To the boiling mixture, a preblend of sugar, acid and color were added and mixed until dissolved. The mix temperature was then reduced to 130° F. (54.4° C.) and glycerol and flavorant added. The mix was then cooled to 120° F. (49° C.) and held for dipping the fabricated blueberry pieces. The dipped droplets were then removed from the bath and dried as previously described. The dried pieces were coated with a fine mist of sunflower oil to facilitate handling.

What is claimed is:

1. A food product simulating fruit pieces having a substantially continuous moisture resistant sweetened coating, comprising:
   A. about 25% to 99% of the piece of a gelled center having a weight of about 0.5 to 1.1 g and comprising:
      1. about 45% to 60% by weight of a humectant,
      2. about 15% to 25% by weight of dissolved nutritive carbohydrate sweetener,
      3. about 0.8% to 1.5% of an acidulant,
      4. about 9% to 15% of a modified starch,
      5. about 0.1% to 1% of a salt, and
      6. about 5% to 10% moisture;
   B. about 1% to 75% of the piece of a base coat adhered to the gelled center, comprising dried fruit particles;
   C. about 1% to 10% of a top coat of a film forming hydrophilic colloid overlaying the base coat; and
   wherein the total fat content of the piece is 5%>,
   wherein the water activity of the piece ranges from about 0.3 to 0.5.

2. The food product of claim 1 wherein the piece includes about 50% to 75% of the base coat of dried fruit material in particulate form.

3. The food product of claim 2 wherein the base coat dried fruit particles are infused with a humectant and range from about 0.1 to 4 mm in size.

4. The food product of claim 3 additionally including an overcoat of an edible oil whereby stickiness is minimized.

5. The food product of claim 3 wherein in the gelled center the humectant is selected from the group consisting of glycerol, sorbitol, xylitol, propylene glycol and mixtures thereof.

6. The food product of claim 5 in the form of a quantity of said food pieces.

7. The food product of claim 6 additionally comprising about 50% to 99% of an R-T-E cereal blended with about 1% to 50% of the quantity of fruit pieces.

8. The food product of claim 5 wherein the gelled center comprises about 25% to 50% of the piece.

9. The food product of claim 8 wherein the water activity ranges from about 0.35 to 0.45 and wherein at least a portion of the dried fruit material is blackberry, raspberry, strawberry and mixtures thereof, whereby the food product simulates a dried composite fruit.

10. The food product of claim 9 wherein the base coat fruit particulates are infused with a humectant selected from the group consisting of glycerol, sorbital, high fructose corn syrup and mixtures thereof.

11. The food product of claim 8 wherein the topcoat includes gellan gum.

12. The food product of claim 11 wherein the edible oil overcoat is present at about 0.005%.

13. The food product of claim 2 wherein the base coat additionally comprises about 1% to 25% of the base coat of a dried cereal material in particulate form.

14. The food product of claim 13 wherein the top coat includes gellan gum.

15. The food product of claim 13 additionally including an overcoat of an edible oil whereby stickiness is minimized.

16. A process for producing a simulated fruit comprising the steps of:
   (A) forming a low moisture gelled center having high levels of humectant to form sticky gelled core pieces;
   (B) coating the low moisture gelled center with a base coat, said base coat being formed of dried particulates, at least a portion of which are dried fruit particulates to form a gelled center having a dried fruit containing particulate base coat; and
   (C) applying a final thin film top coat overlaying the base coat, said top coat comprising a sweetened aqueous dispersion of a film forming hydrophilic colloid.

17. The process of claim 16 wherein the piece includes about 50% to 75% of the base coating of dried fruit material in particulate form.

18. The process of claim 17 wherein the base coat dried fruit particles are infused with a humectant and range from about 0.5 to 4 mm in size.

19. The process of claim 18 wherein the dried fruit is selected from the group consisting of raisins, cranberries, figs, cherries, prunes, pineapples, apples, bananas, apricots, dates and currants.

20. The process of claim 19 wherein the dried fruit has a moisture content of about 13% to about 18% by weight.

21. The process of claim 20 wherein the dry particulates include at least one cereal from the group consisting of wheat germ, oat bran, wheat bran and shredded wheat particulates.

22. The process of claim 21 wherein the dry particulates include a nut flavoring, nut meal or nut particles.

23. The process of claim 22 wherein the nut flavoring, nut meal or nut particles are selected from the group consisting of almond, walnut, pecan, macadamia, peanut and hazel nut.

24. The process of claim 23 wherein the nut meal or nut particles have a particle size between about 12 mesh and about 16 mesh.

25. A food product simulating fruit pieces having a substantially continuous moisture resistant sweetened coating, comprising:
   A. about 50% to 75% of the piece of a gelled center having a weight of about 0.5 to 1.1 g and comprising:
      1. about 45% to 60% by weight of a humectant,
      2. about 15% to 25% by weight of dissolved nutritive carbohydrate sweetener,
      3. about 0.8% to 1.5% of an acidulant,
      4. about 9% to 15% of a modified starch,
      5. about 0.1% to 1% of a salt, and
      6. about 5% to 10% moisture;
   B. about 1% to 10% of a top coat of a film forming hydrophilic colloid overlaying the base coat; and
   wherein the total fat content of the piece is 5%>,
   wherein the water activity of the piece ranges from about 0.3 to 0.5.

26. The food product of claim 25 wherein in the gelled center the humectant is selected from the group consisting of glycerol, sorbitol, xylitol, propylene glycol and mixtures thereof.

27. The food product of claim 26 wherein the gelled center comprises about 25% to 50% of the piece.

28. The food product of claim 27 wherein the top coat includes gellan gum.

* * * * *